United States Patent

[11] 3,607,663

| [72] | Inventor | Leonard B. Vandenberg |
| | | Scotia, N.Y. |
| [21] | Appl. No. | 869,723 |
| [22] | Filed | Oct. 27, 1969 |
| [45] | Patented | Sept. 21, 1971 |
| [73] | Assignee | General Electric Company |

[54] FLUID PURIFICATION SYSTEM
9 Claims, 8 Drawing Figs.

[52] U.S. Cl............................................................ 202/173,
202/234, 202/185 A, 203/11, 203/26, 203/100, 122/31, 60/104
[51] Int. Cl........................................................ B01d 3/02,
B01d 3/00
[50] Field of Search........................................... 202/185 A,
234, 173; 203/10, 11, 100, 26, DIG. 14, DIG. 20; 159/2 MS, DIG. 16, DIG. 22; 122/31–34, 459

[56] References Cited
UNITED STATES PATENTS

| 3,155,600 | 11/1964 | Williamson.................... | 202/173 X |
| 3,288,685 | 11/1966 | Kemper et al................. | 202/182 X |
| 3,288,686 | 11/1966 | Othmer........................ | 203/11 |
| 3,329,583 | 7/1967 | Othmer........................ | 203/10 |
| 3,332,401 | 7/1967 | Lustenader................... | 122/31 |
| 3,249,517 | 5/1966 | Lockman...................... | 159/18 X |
| 3,509,932 | 5/1970 | Chambers..................... | 159/6 X |

*Primary Examiner*—Norman Yudkoff
*Assistant Examiner*—J. Sofer
*Attorneys*—William C. Crutcher, Frank L. Neuhauser, Oscar B. Waddell and Joseph B. Forman ABSTRACT: A desalination system using a cascade of modified venturi tubes to extract fresh water from saturated steam in the nozzle throat with pressure recovery in a diffuser section. Heat transfer for regenerative feedwater heating as feedwater flows up the cascade is achieved by direct contact between fluids. Hydraulic regeneration to reduce pumping energy is obtained by feedwater flowing down the cascade providing energy to move brine and fresh liquid product up the cascade.

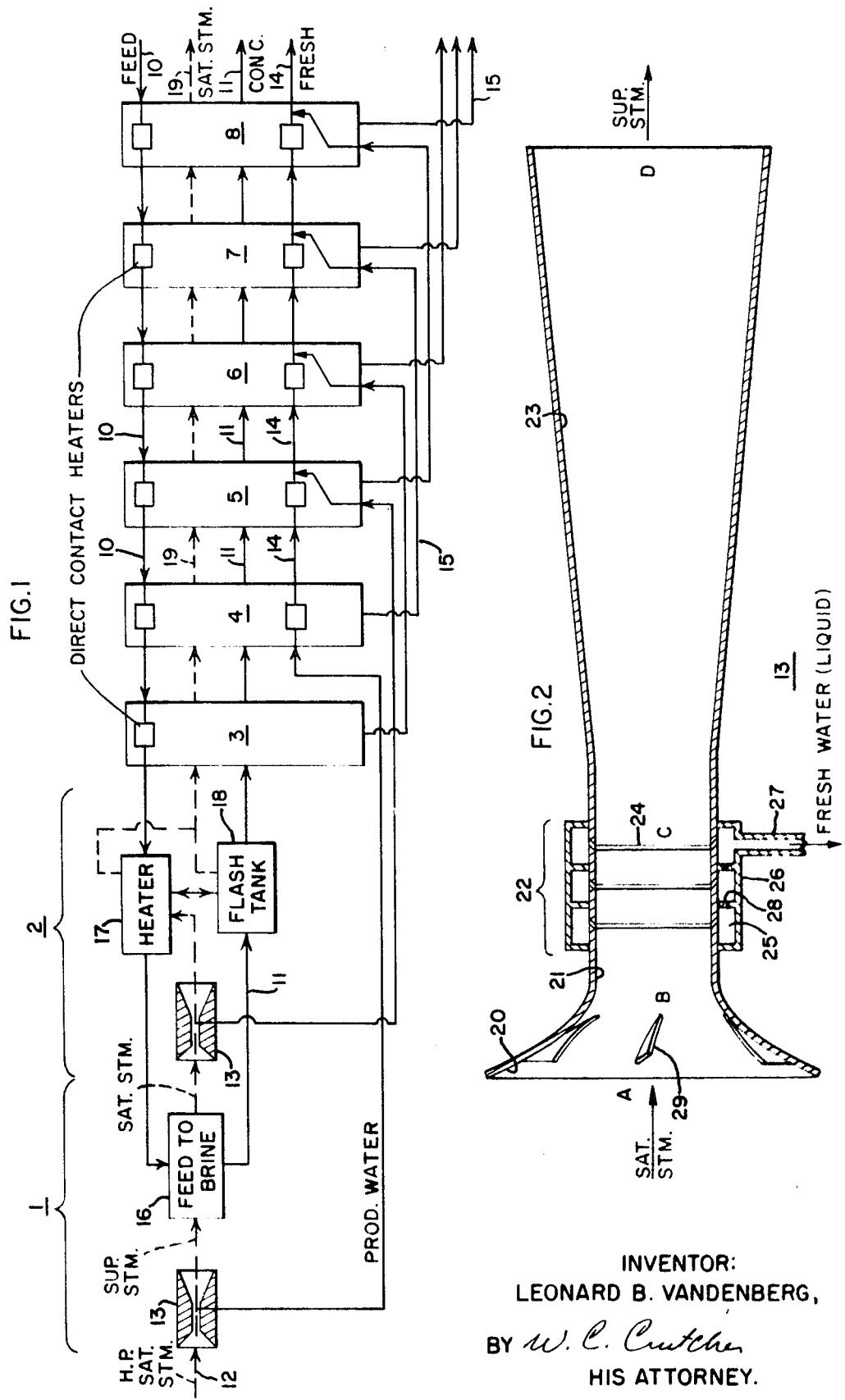

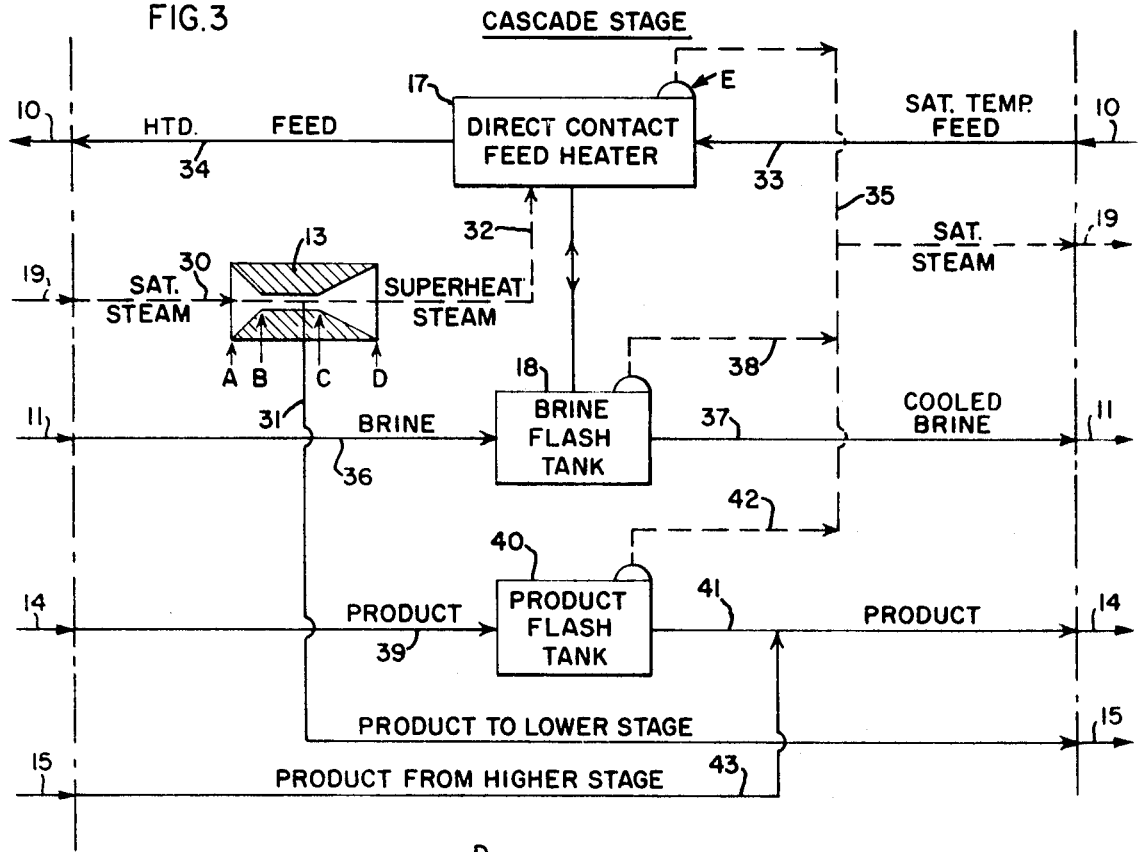
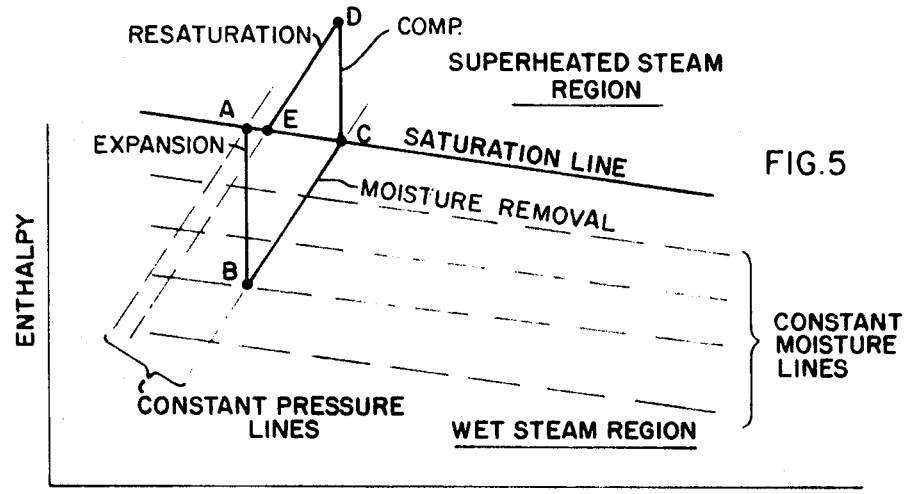
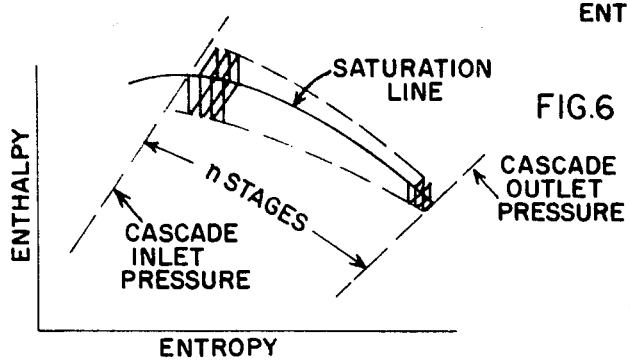

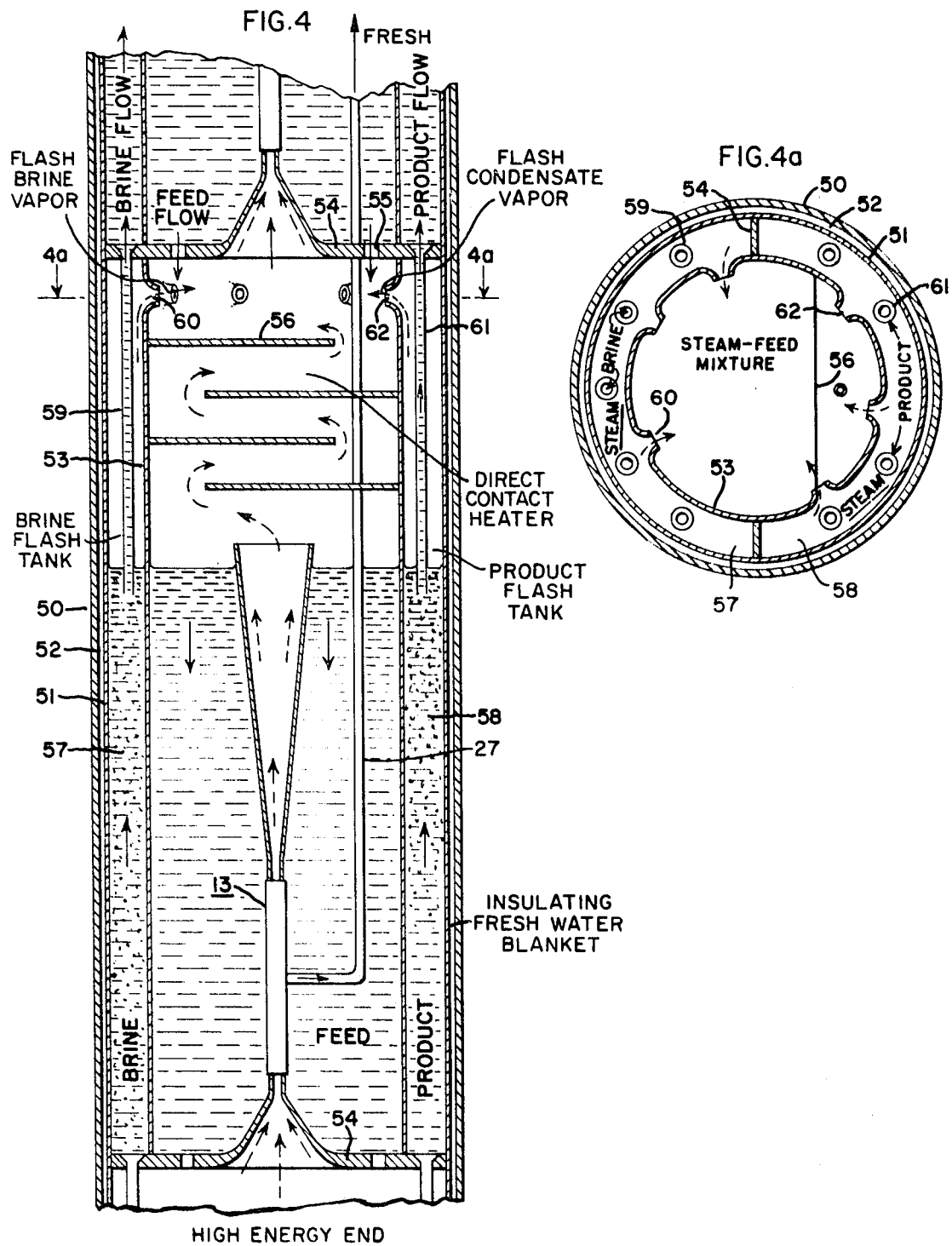

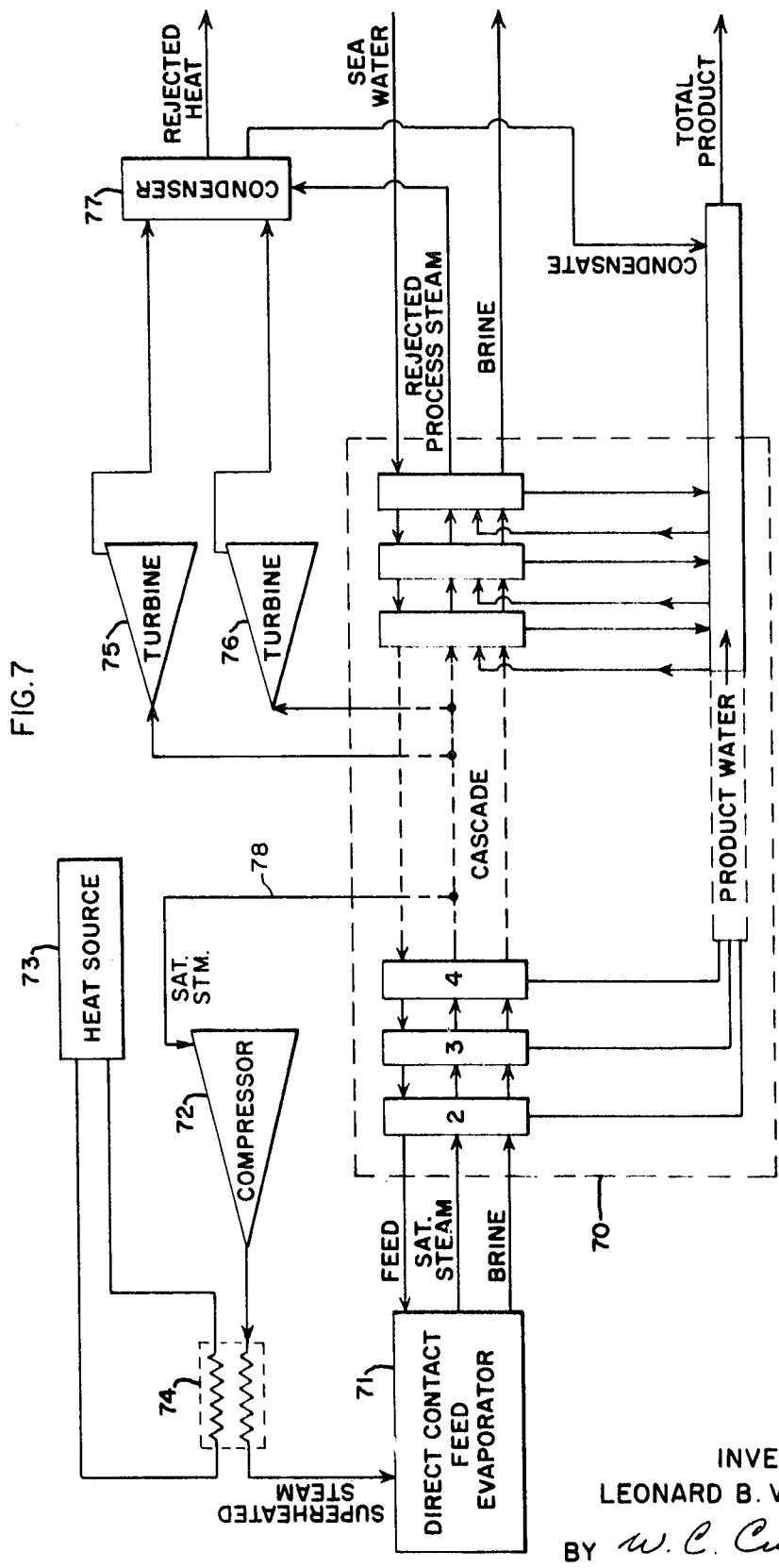

FLUID PURIFICATION SYSTEM

BACKGROUND OF THE INVENTION

This invention relates generally to a fluid purification system and more specifically to a thermal desalination system of the regenerative cascade type for the recovery of fresh product water from brackish or saline water.

Various types of thermal desalination systems are known in the art. These usually employ the distillation process wherein steam is flashed or evaporated from thin films and recondensed as fresh product while the concentrated residue or brine is removed. Such systems invariably result in heat transfer through surfaces in contact with the salt water and the resulting residue reduces heat transfer capabilities and causes corrosion problems. Greatly improved results could be achieved if heat transfer processes took place through direct contact between fluids.

It is well known that the thermodynamic state of a fluid is also dependent upon the dynamic conditions of fluid flow. Suggestions have been made in the prior art of utilizing the kinetic properties of a fluid to obtain fresh water. For example, in U.S. Pat. 3,332,401 issued to E. L. Lustenader on July 25, 1967 and assigned to the present assignee, the superheat region in the core of a vortex is used to flash preheated feedwater with the liquid residue being centrifuged through collecting slots and removed. U.S. Pat. No. 3,288,685 uses a vapor accelerated through a venturi to improve a distillation cycle. These patents both describe a single stage device not readily adaptable to cascade regenerative recovery of fresh water.

Accordingly, one object of the present invention is to provide an improved regenerative cascade desalination system giving improved performance.

Another object of the invention is to provide an improved thermal desalination system employing direct contact heat exchange and profitably utilizing the kinetic properties of steam.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a schematic block diagram of the first few stages of a cascade,

FIG. 2 is an enlarged cross-sectional view of one form of nozzle/collector/diffuser device suitable for practicing the invention, FIG. 3 is a schematic block diagram of one stage of the cascade illustrated in FIG. 1, FIG. 4 is a simplified cross-sectional view of the physical embodiment of a vertically disposed cascade stage analogous to that shown in FIG. 3, FIG. 4a is a cross section through section 4a—4a of FIG. 4, FIG. 5 is a portion of a Mollier diagram illustrating process steam properties through one stage, FIG. 6 is a similar Mollier diagram illustrating steam properties over the full cascade, and FIG. 7 illustrates a modified form of the invention.

Referring now to FIG. 1 of the drawing, the schematic block diagram of the cascade shows a first stage 1, a second stage 2, and a number of additional downstream stages 3–8, these being connected in series and typical of a much greater number of stages which may be up to 300 more in number. Feedwater, indicated by arrows 10, is heated as it travels up the cascade; it returns down the cascade as brine of increasing concentration indicated by the arrows 11. The brine is cooled in each of the succeeding stages traveling down the cascade as will be explained in detail.

Process steam at a high pressure and in saturated state enters the upper end of the cascade as indicated at 12, through a nozzle/collecter/diffuser device 13. Fresh product water is collected from device 13 and is inserted at the proper stage downstream to give the correct heat balance, here shown as stage 4. From then on, product or fresh water flows down the cascade as indicated by arrows 14, being supplemented in each stage by product water from a higher stage through bypass lines 15. Saturated steam flow down the cascade between stages is indicated by dashed arrows 19.

Stage 1, being the initial stage, is slightly different from lower stages and it includes device 13 and a direct contact heater or feed-to-brine tank 16 which terminates the feed water cascade and commences the brine cascade. Stage 2 includes a nozzle/collector/diffuser 13, a direct contact feed heater 17, and a brine flash tank 18. The function of these devices will be explained thoroughly in connection with description of the downstream stages 3–8. Also it will be understood that although shown as separate blocks in the block diagram, any of these devices such as direct contact heater 17 and flash tank 18, are functionally incorporated within the equipment.

FIg. 2 is illustrative of a typical nozzle/collector/diffuser device 13. It comprises a tubular member having a convergent section 20, an elongated nozzle throat 21 which includes a collecting section 22 of uniform diameter, and a diffuser section 23 of gradual increasing cross section. The collecting section 22 comprises a series of circumferential angled slots 24 opening into partitioned section 25 in a surrounding sleeve 26. Water egresses from outlet tube 27. The chambers 25 are at slightly different pressure and are connected by pressure equalizing holes 28 which also provide passage for water to pipe 27. A slight whirl is given to steam entering the converging section 20 by means of vanes 29 disposed to assist in centrifugal removal of water droplets through slots 24. Although the collecting slots are shown only in the throat section, they may also extend into the diffuser section to assist in improving diffuser efficiency through boundary layer removal. In some cases, porous walls may be used in lieu of slots.

FIG. 3 of the drawing shows a typical cascade stage in schematic form. Saturated steam entering the stage at 30 is expanded into the wet steam region and product water is removed at 31 and carried to a lower stage in the cascade. Kinetic energy is recovered in the diffuser. Steam, now in the superheat region at a slightly lower pressure, flows to the direct contact feed heater as indicated at 32. Feedwater at saturation temperature from a lower stage enters feed heater at a higher pressure at 33 and exits at this pressure and associated saturation temperature at 34, the heat being furnished from the superheat steam entering at 32. Saturated steam leaves the heater 17 at 35 and flows to the next stage.

Brine flowing down the cascade at 36 enters the brine flash tank 18 and is cooled by flashing a portion of the liquid to saturated steam. Cooled brine exits to the next stage at 37 and saturated steam leaves at 38 to join the other steam flow to the next stage.

In a similar manner, fresh product flows down the cascade entering at 39 to be cooled in a product flash tank 40. Cooled product leaves at 41 and saturated steam at 42 to join the other steam flow. The product flow at 41 is supplemented at 43 by product from a higher stage.

The schematic diagram shown in FIG. 3 can take many forms in actual hardware, a typical conceptual design for a stage being illustrated in FIG. 4. In FIG. 4, the stage is arranged in a vertical fashion to provide for hydraulic regeneration, i.e. the descending feedwater provides the liquid heat to drive water turbines and pumps for the ascending product liquid and liquid brine. It will be understood with reference to FIG. 4 that the "upper" part of the cascade of (or higher energy level) is at the bottom of the drawing. In FIG. 4, a vertical stand pipe containing several stages comprises a pressure wall 50 separated from an outer stage wall 51 by an insulating fresh water blanket 52. An inner stage wall 53 (see the cross section of FIG. 4a is spaced inwardly from outer stage wall 51. Subdividers 54 separate the annular space between walls 51,53 into product and brine compartments respectively. Stages are separated by horizontal plates 54 with feed holes 55 to allow feedwater to flow from one stage to the next, down the stand pipe (up the cascade). This flow is slowed and directed by staggered baffles 56, where it comes in contact with and saturates steam flowing from the diffuser outlet of device 13. Thus the path through the baffle plates represents direct contact feed heater 17 of FIG. 3.

Two semicircular chambers 57,58, which are formed between the inner and outer walls by dividers 54 serve to hold the ascending brine and fresh product liquid respectively. These correspond to the brine flash tank 18 and product flash tank 40 respectively (see FIG. 3). Liquid brine flows upwardly through pipes 59, while flashed steam flows into the central chamber through ports 60. Similarly, liquid product flows upwardly through pipes 61 while flashed steam enters the central chamber through ports 62.

The operation of the invention from a thermodynamic standpoint will be better understood by reference to FIGS. 5 and 6 of the drawing. FIG. 5 represents the various thermodynamic states undergone by one stage of process steam in flowing through the device 13 and the direct contact feed heater 17, and will be better understood by reference to both FIG. 3 and FIG. 5 in connection with the description. The various states are designated A through E. Saturated steam entering the nozzle inlet at A undergoes isentropic expansion and corresponding acceleration into the wet steam region at B at the nozzle throat. Moisture removal takes place through the nozzle throat in a constant pressure process until the steam reaches saturated condition at C at the diffuser inlet. From C to D the steam undergoes isentropic compression in the diffuser as kinetic energy is recovered and leaves the diffuser outlet at low velocity in a superheated condition. The steam is resaturated at constant pressure in the direct contact feed heater 17 ending up at point E at a slightly lower pressure.

FIG. 6 indicates how the same process is repeated over and over again along the cascade.

As an example of the foregoing, the performance of a typical cascade assuming hydraulic regeneration (no pumping loss) and diffuser efficiency of 90 percent, a flow of 20 pounds of sea water feed, with a cascade input at stage 1 of 2 pounds of saturated steam at 3200 p.s.i., and having 280 stages will yield a product of 12½ pounds of pure water.

Various improvements in the cycle can be achieved by expedients known to those skilled in the art in similar cycles. For example, since the work to compress steam is considerably less at high pressure than at low pressures, and since water produced per unit pressure drop is greater at higher pressure, the cycle can be improved by extraction of steam and recompression to initial stage pressure. A second advantage of recompression results from a reduction in makeup water heating requirements. The heat released during steam compression from a lower pressure stage to 3200 p.s.i. may be used to top a lower temperature heat source to supply the process steam required by the initial stage.

As an example, if steam is extracted from stage 80 in the foregoing example at 2300 p.s.i. and recompressed to enter the cascade at stage 1, the performance ratio (defined as pounds of pure water produced per 1000 B.t.u., rises from 6.8 to 7.0.

Many such variations of varying cycle complexity will occur to those skilled in the art. One such modification is seen in FIG. 7, in which the stages 2, 3, 4, etc. of the cascade shown in FIG. 1 are enclosed within the dashed lines indicated as 70. The modification serves to exploit the low heats of evaporation of saturated sea water feed at near critical temperatures and pressures by the injection of superheated steam directly into a direct contact feed evaporator 71 serving as stage 1 of the cascade. A compressor 72 withdraws steam from a selected point in the cascade 70 via extraction conduit 78 and supplies it to evaporator 71. A supplementary heat source 73 and heat exchanger 74 provide make up heat if the heat of compression is insufficient.

To further enhance the cycle, power may be produced by the excess steam produced in the lower end of the cascade. Turbines 75,76 utilize steam in a pressure range on the order of 500 p.s.i. or less, exhausting to condenser 77. Stage efficiency requirements may be reduced in this region resulting in a reduction in the number of stages.

Further objects and advantages of the invention will occur to those skilled in the art. Although the invention has been illustrated and described with reference to a desalination system, it is applicable to any fluid purification system with a modification to provide for the thermodynamic and kinetic properties of a particular fluid.

What I claim as new and desire to secure by Letters Patent of the United States is:

1. A desalination cascade of stages, each of said stages comprising:

a source (33) of heated feedwater from a lower stage,
a source (30) of saturated steam form a higher stage,
nozzle means connected to said steam source and arranged to expand and accelerate said steam and increase its relative moisture content,
collecting means constructed to remove a portion of said moisture as product water,
diffusing means arranged to recompress said steam into a superheated state by recovery of kinetic energy,
a first chamber (17) connected to said feedwater source and arranged to heat the feedwater by direct contact with said superheated steam thereby resaturating the steam,
first conduit means (34) conducting heated feedwater from said chamber to a higher temperature and pressure stage, and second conduit means (35) conducting saturated steam from said first chamber to a lower temperature and pressure stage.

2. The combination according to claim 1, wherein each of said stages includes a second chamber (18) connected to receive brine from a higher temperature and pressure stage and to supply it to a lower temperature and pressure stage, said second chamber being arranged to cool the brine by flashing a portion thereof into additional saturated steam and having third conduit means (38) connected to conduct said last mentioned saturated steam into said second conduit means.

3. The combination according to claim 1, wherein each of said stages includes a third chamber (40) connected to receive fresh product water from a higher temperature and pressure stage and to supply said product to a lower temperature and pressure stage, said third chamber being arranged to cool a portion of the product water by flashing it into saturated steam and having fourth conduit means (42) connected to conduct said last mentioned saturated steam into said second conduit means.

4. The combination according to claim 3, including fifth conduit means connected to said collecting means and carrying fresh product water to a lower temperature and pressure stage, and further including sixth conduit means (43) conducting fresh product from the third chamber of a higher temperature and pressure stage and connected to supplement the fresh product flow from the third chamber of the instant stage.

5. The combination according to claim 1, wherein said nozzle means, said collecting means and said diffusing means together comprise a convergent divergent tube with an extended throat section, said throat section defining openings in the wall for liquid collection.

6. The combination according to claim 5, wherein said convergent portion includes whirl vanes to assist in centrifugal separation.

7. The combination according to claim 1, including first extraction conduit means connected to extract a portion of the saturated steam from one of the intermediate stages of said cascade, and compressor means connected to said extraction conduit and arranged to compress said steam to the inlet pressure of the cascade and also connected to introduce said extracted compressed steam into a direct contact feed evaporator connected to receive superheated steam from a compressor means and serving as the source of saturated steam for the second stage.

8. The combination according to claim 7 and further including second extraction conduit means withdrawing saturated steam from the cascade, and turbine means connected to the second extraction conduit means.

9. The process of purifying a fluid by extraction of liquid from a vapor thereof comprising the steps of:
 a. expanding substantially pure saturated vapor substantially isentropically into a partial liquid phase by accelerating it through a nozzle,
 b. collecting a substantially pure liquid portion from said accelerated vapor by separation at constant pressure until the resulting vapor again reaches a saturated condition,
 c. compressing the resulting vapor substantially isentropically into a superheated condition by passing it through a diffuser,
 d. contacting the superheated vapor with a source of impure liquid in a direct contact heat exchange to preheat the impure liquid and reduce the superheated vapor to a substantially pure saturated vapor,
 e. repeating steps a–d in the multistage cascade using the resulting saturated vapor generated by step (d) the source of saturated vapor for step (a) in the next lower temperature and pressure cascade stage.